United States Patent [19]

Harris et al.

[11] Patent Number: 5,452,707
[45] Date of Patent: * Sep. 26, 1995

[54] BARBECUE GRILL CART ASSEMBLY

[75] Inventors: Rodney G. Harris, Tallassee, Ala.; John Seal, Vaucluse, S.C.; Robert L. Johnston; Marvin R. Windham, both of Columbus, Ga.

[73] Assignee: W. C. Bradley Company, Columbus, Ga.

[ * ] Notice: The portion of the term of this patent subsequent to Sep. 11, 2007 has been disclaimed.

[21] Appl. No.: 872,502

[22] Filed: Apr. 23, 1992

(Under 37 CFR 1.47)

Related U.S. Application Data

[63] Continuation-in-part of Ser. No. 743,080, Aug. 9, 1991, Pat. No. 5,109,834, which is a continuation-in-part of Ser. No. 554,661, Jul. 17, 1990, Pat. No. 5,072,718, which is a continuation-in-part of Ser. No. 392,790, Aug. 11, 1989, Pat. No. 4,955,358.

[51] Int. Cl.[6] ..................................... A47J 37/00
[52] U.S. Cl. ..................... 126/41 R; 126/25 R; 126/30; 126/39 B
[58] Field of Search ............... 126/41 R, 25 R, 126/30, 98, 277, 304 R, 306, 39 B

[56] References Cited

U.S. PATENT DOCUMENTS

| | | | |
|---|---|---|---|
| 4,955,358 | 9/1990 | Harris et al. | 126/25 R |
| 5,072,718 | 12/1991 | Seal | 126/41 R |
| 5,109,834 | 5/1992 | Collins et al. | 126/41 R |

Primary Examiner—Larry Jones
Attorney, Agent, or Firm—Hopkins & Thomas; James W. Kayden

[57] ABSTRACT

A barbecue grill cart assembly is provided having a unique leg locking system at each corner. The locking system provides a plurality of contact points for each leg to obviate any swaying or twisting of the legs. The lower shelf includes extruded bolt receiving apertures which mate with corresponding apertures in the legs. The side shelves having a locking system including elongated slots which provide positive engagement and prevent accidental lowering of the shelves.

6 Claims, 3 Drawing Sheets

BARBECUE GRILL CART ASSEMBLY

This application is a continuation-in-part of application Ser. No. 07/743,080 filed Aug. 9, 1991 now U.S. Pat. No. 5,109,834 which is a continuation-in-part of application Ser. No. 554,661, filed Jul. 17, 1990, now U.S. Pat. No. 5,072,718, which is a continuation-in-part of application Ser. No. 392,790 filed Au. 11, 1989 which is now U.S. Pat. No. 4,955,358.

BACKGROUND OF THE INVENTION

It is common for barbecue grills, and especially gas barbecue grills, to be situated on a movable cart. Such carts, in general, have the grill situated centrally on the top of the cart, have shelves, including a bottom or lower shelf for holding an LP gas tank, and include wheels for ease in moving the cart from place to place. The cart is normally designed so as to locate the cooking surface of the grill at approximately the waist-level of an adult for ease and comfort of use of the grill.

This arrangement placed most of the weight of the assembly, i.e., the grill itself, at the top, resulting in a top-heavy and possibly unstable configuration. This problem is magnified by the movement to which the cart is subjected both in moving the cart and in opening and closing the grill during use. Other factors such as age and the effects of weather also play a part in the stability of the cart and, in combination, may lead to a collapse or, more typically to pronounced swaying of the cart as the assembly is used and moved. Some attempts to correct such problems have included the use of thicker structural members which, in many cases, serves only to increase the cost of the assembly while actually magnifying the problem.

SUMMARY OF THE INVENTION

It is, therefore, one of the principal objects of the present invention to provide a barbecue grill cart assembly that is extremely rigid and stable in use, utilizing structural members designed to interlock at the intersections thereof.

Another object of the present invention is to provide a cart assembly that provides superior stability without an attendant increase in weight and which utilizes standardized structural members for carts of different sizes.

A further object of the present invention is to provide a cart assembly having a unique locking means for securing the legs and bottom shelf together and another unique locking means for the auxiliary side shelves.

A still further object of the present invention is to provide a barbecue grill cart that is easily and quickly assembled and which is durable to provide a long service life.

These and additional objects are attained by the present invention which relates to a barbecue grill cart assembly having structural members which are designed to interlock at the intersection points, thereby providing an integrated structure in which the members are interdependent on one another for support. Each structural member is connected to at least two other structural members, with close tolerances designed into the cart for providing the necessary rigidity. Unique locking systems are provided for securing the legs to the bottom shelf or platform and also for securing the auxiliary side shelves to the legs.

Various additional objects and advantages of the present invention will become apparent from the following description, with reference to the accompanying drawings.

DETAILED DESCRIPTION OF THE PREFERRED EMBODIMENT

Figure 1:
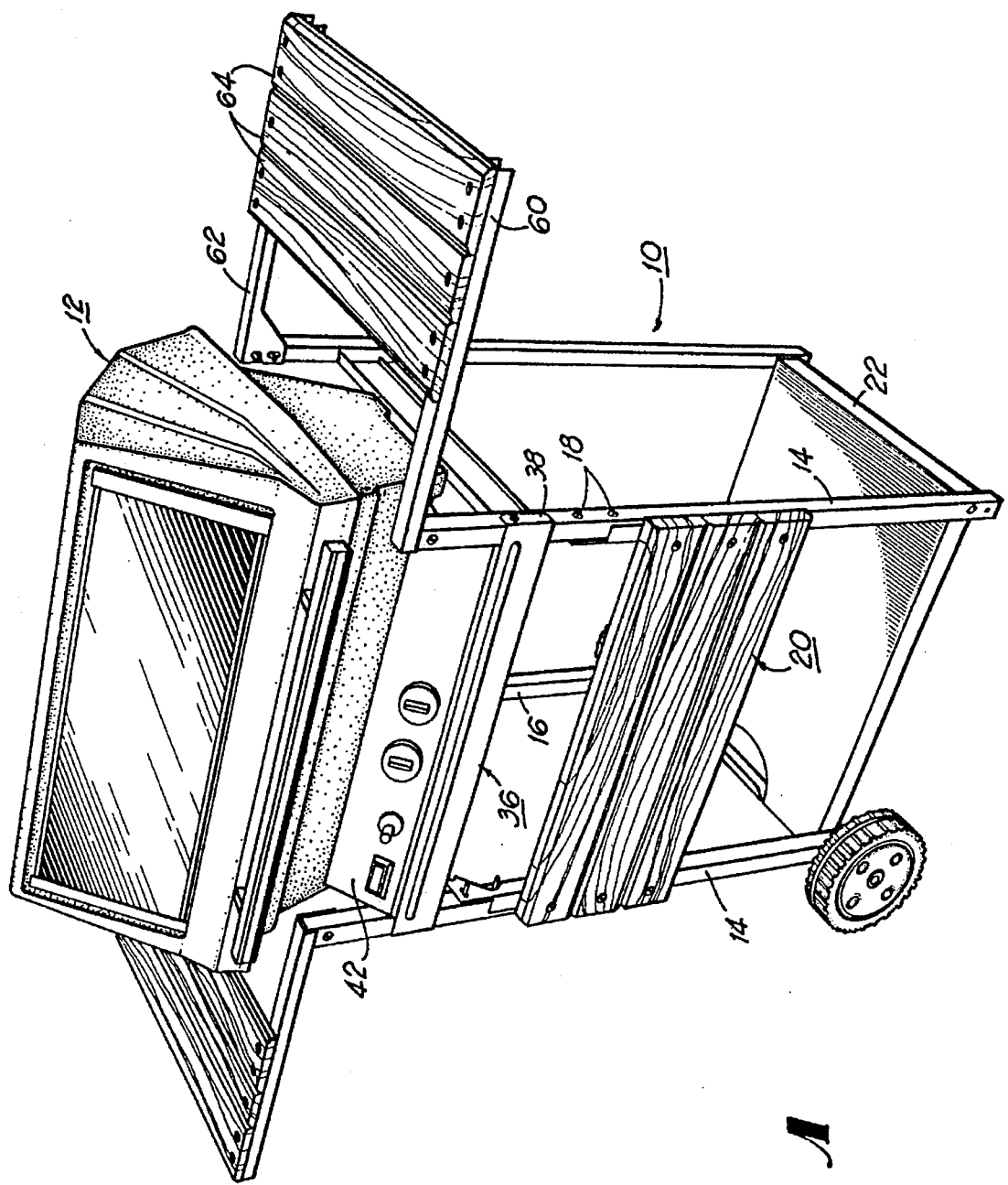
FIG. 1 is a perspective view of the present barbecue grill cart assembly, shown here in completely assembled form with a barbecue grill supported thereby.
Figure 5:
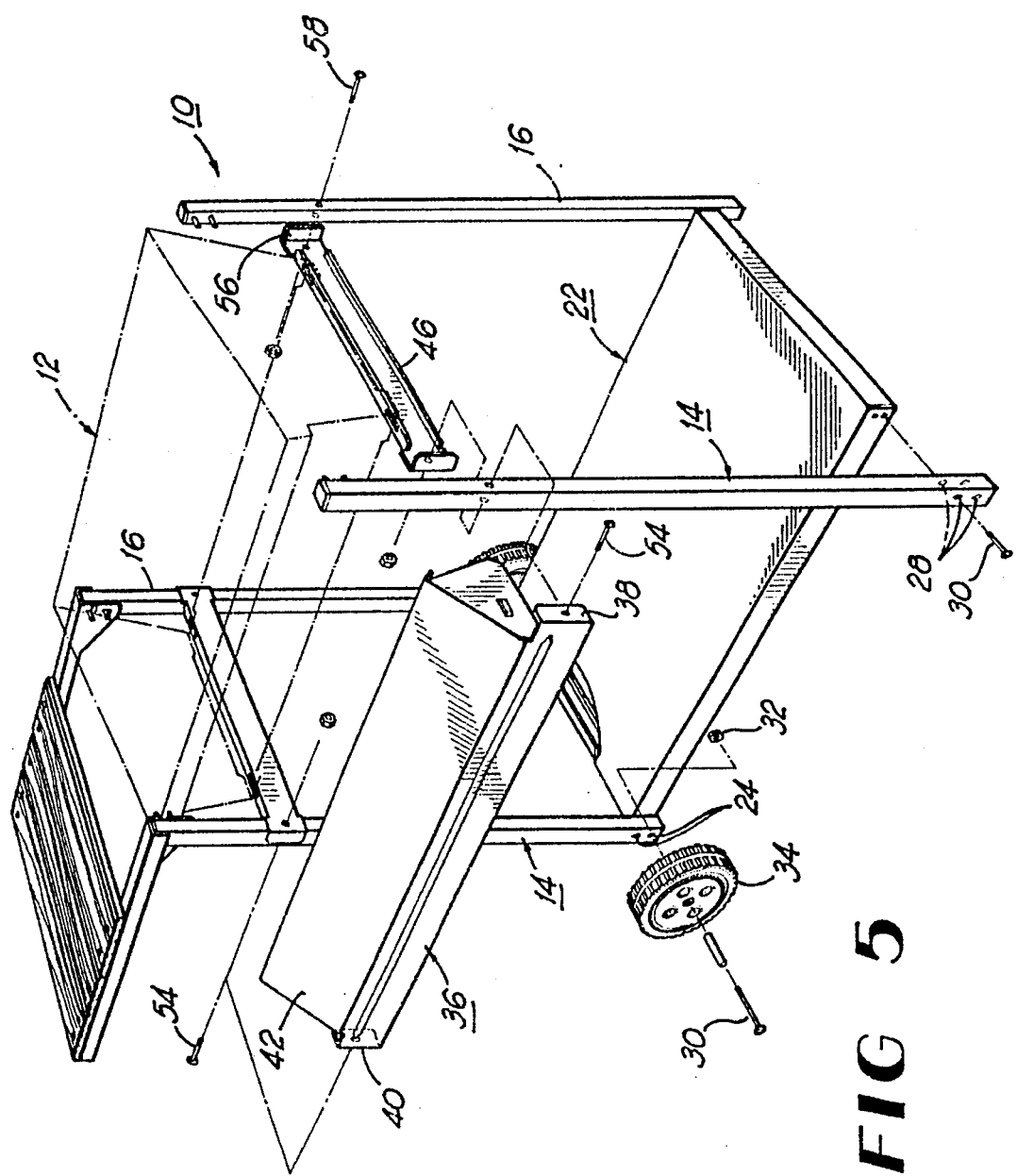
FIG. 5 is an exploded, partial perspective view of the present barbecue grill cart assembly.

Referring now more specifically to the drawings, and to FIGS. 1 and 5 in particular, numeral 10 designates generally the present barbecue grill cart assembly, shown here supporting a barbecue grill 12. The cart assembly includes four, generally identical legs, thus facilitating manufacturing. The major difference between the front legs 14 and the rear legs 16 is the provision of apertures in the front legs for receiving bolts or pins 18 for supporting a front shelf 20. The front shelf itself is conventional and can be disposed in a folded vertical position, as shown in FIG. 1, or in a horizontal position, disposed generally perpendicular to the vertical legs.

The structural members of the present cart assembly are preferably composed of steel or other heat-resistant material. Most of the components can be economically formed in a stamping operation, with the legs normally formed in a cold drawing process. The front and rear leg sets 14 and 16 are connected to a lower or bottom shelf 22. The bottom shelf may be of solid construction as shown here, or may be a wire grid. In either case, the shelf 22 is used for supporting an LP gas tank (not shown), where LP gas is used as a fuel source as opposed to natural gas or charcoal. With natural gas or charcoal grills, the shelf is simply used for storage, etc.

Figure 4:
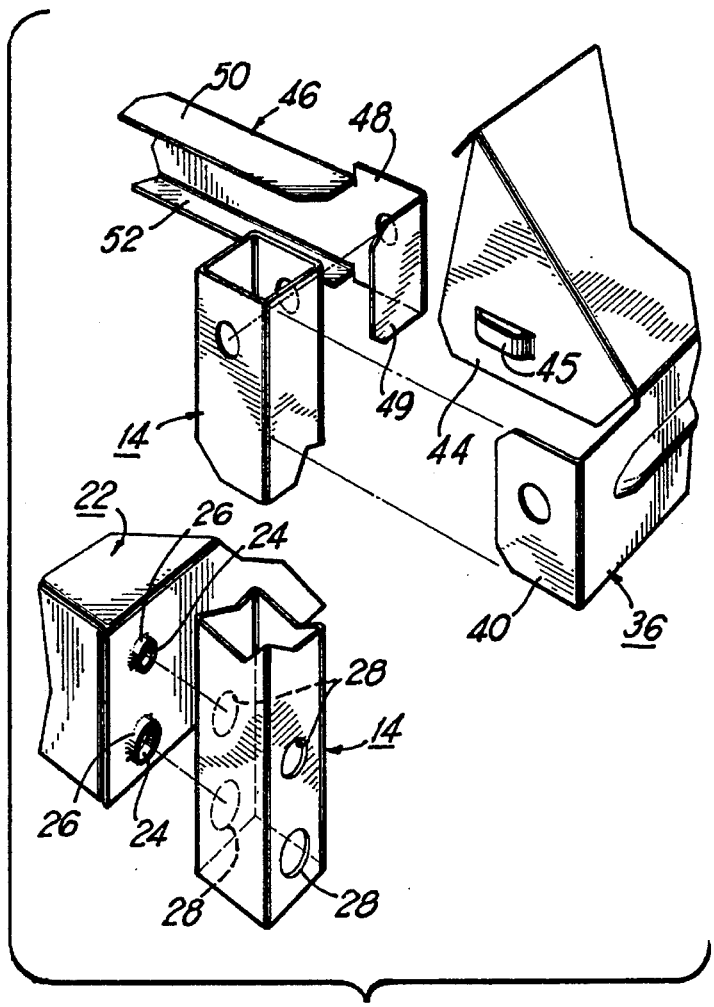
FIG. 4 is a partial, fragmentary exploded perspective view of the leg/bottom shelf connection and an upper structural member intersection.

Referring to FIG. 4, one of the corners of the shelf 22 is illustrated. Each corner is provided with a pair of vertically spaced apertures 24. The apertures are each surrounded by a laterally extending, continuous flange 26, which flanges are aligned and mated with corresponding apertures 28 formed in each leg near the lower end thereof. This construction provides positive locking of the individual leg members to the shelf 22 in conjunction with securing means such as bolts 30 and nuts 32. One or more such bolts are provided for each leg, and one may also serve as an axle for wheels 34 and/or casters (not shown). The provision of the dual locking system prevents racking or twisting of the legs relative to the shelf 22, a problem that is common with most prior art cart assemblies of similar design and/or function.

The structural assembly of the upper portion of the present cart is illustrated in FIGS. 1, 4, and 5. In the past, most such carts have used struts to connect the legs, which struts extend from one leg to an adjacent leg. The four independent struts all acted independently and the carts were prone to swaying and/or twisting the present invention obviates any such problems by utilizing an interconnected, three-way locking system. The cart assembly includes a front panel member 36 with right and left side flanges 38 and 40 respectively, as viewed in FIG. 5. The sloped portion of plate member 36 serves as the control panel 42 for the grill and also as a contact point for the legs. Depending from the control panel are side members 44 which, in combination with the side flanges, define a receiving area for the legs. Thus, the front panel member extends between and connects the front legs 14. Extending from side members 44 are abutment means 45 which engage flanges 50 upon assembly of the upper frame portion of the cart.

Connecting the front legs to the back legs are side struts 46 which include laterally extended flange means 48 and 49, an upper mounting flange 50, and a lower horizontal flange 52. Between flange means 49 and the upper and lower flanges 50 and 52, respectively, is defined a receiving area for the leg member. The side struts are preferably disposed at approximately the same level as the front panel such that a single bolt 54, or similar fastening means, is used at each corner to connect the front panel and the side struts to the front legs, the bolt extending through the aligned apertures provided therein. The flanges 48, 49, 50 and 52 are thus disposed adjacent the leg members, providing a very secure and stable construction. It is to be understood, however, that the just described structural members can also be separately connected at different levels and provide the same securing effect.

The side struts have the same type of connection to the rear legs, as shown in FIG. 5. A flange means 56 is extended laterally from strut 46 and is disposed adjacent the rear leg when assembled. The rear leg is received between flange 56 and the upper and lower flanges 50 and 52, providing at least two contact points in both vertical planes, creating a resisting couple to prevent twisting or swaying of the legs. A suitable fastening means, such as bolt 58, secures the strut to the rear leg. The grill then rests on the upper flanges 50 on the side struts, normally being secured thereon by bolts or similar means which extend through the grill casting and through appropriate apertures formed in the upper flanges. A similar system, utilizing struts which are essentially identical to the side struts 46 may also be used to connect and secure the legs at the lower portions of the legs, which struts may then receive slats or the like to form a bottom shelf.

Figure 2:
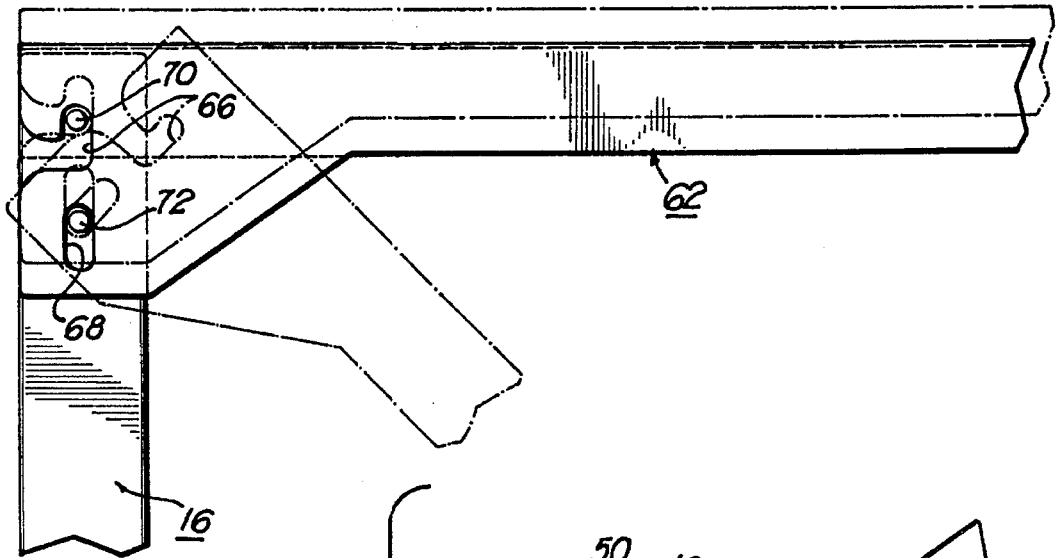
FIG. 2 is a partial, fragmentary, side elevational view detailing the locking system for the connection of the side shelves to the legs with the shelf extended.
Figure 3:
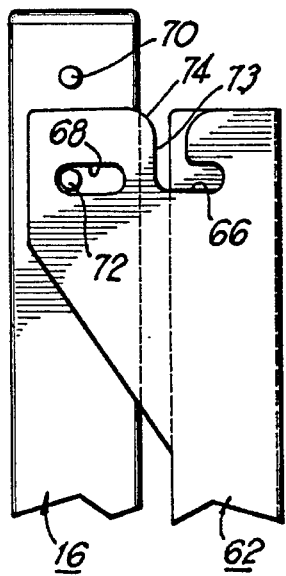
FIG. 3 is a partial, fragmentary side elevational view of the side shelf in folded position.

Another novel feature of the present cart is the design of the connections for the side shelves, illustrated in particular in FIGS. 1, 2, and 3. As can be seen, the side shelves include generally identical front and rear rails 60 and 62, respectively. A series of slats 64 are secured over and extend between the front and rear rails to form the shelves. The rails are connected to the legs through the engagement of a pair of elongated upper and lower slots 66 and 68, respectively, with a pair of corresponding upper and lower pins 70 and 72, respectively. The upper slots have an open guideway 73 leading into the upper slot while the lower slot is closed, capturing the pin therein.

The shelves have a raised, horizontal position and a lowered, vertical position. When moving the shelf from the lowered position of FIG. 3 to the raised position of FIG. 2, the upper pin is directed into the guideway 73 by the curved camming portion 74 at the entrance to the guideway. When the shelf is fully raised, its weight causes it to drop into locked position with the pins engaging the uppermost portions of the slots.

The pins are vertically spaced apart approximately one inch, while the rails may be anywhere from approximately eight to fourteen inches long or longer. This ratio of at least eight to one places a high degree of tension on the pins, which increases as the relative length of the shelf increases. This factor combined with the elongation of the slots makes the shelves extremely rigid while preventing any accidental disengagement of the shelf from the raised position to the lowered position. To disengage and lower the shelf, both hands must be used to lift upwardly on the rails near their point of engagement with the pins. With the shelf so raised, the shelf can be pivoted downwardly to its vertical position, as shown sequentially in FIGS. 2 and 3.

It can be seen that the present invention provides a cart assembly of superior rigidity, which is a safety factor in itself, with additional safety factors designed therein, i.e., the self-locking side shelves the cart is easily assembled and used, and the rigidity of the assembly provides a much longer, trouble-free service life than prior art designs.

Thus, while an embodiment of a barbecue grill cart assembly and modifications thereof have been shown and described in detail herein, various additional changes and modifications may be made without departing from the scope of the present invention.

What is claimed:

1. A barbecue grill cart assembly for supporting a barbecue grill near the upper portions thereof, said cart assembly comprising a plurality of generally vertical leg members disposed in a generally rectangular configuration of front and rear legs, said leg members being connected together and having strut means extending between opposed pairs of said leg members, said strut means including a mounting flange portion and a laterally extended flange portion, said flange portions defining a receiving area for said leg members and providing a plurality of contact points to prevent twisting and swaying of said leg members, and securing means disposed through said leg members for fastening said assembly together.

2. A barbecue grill cart assembly as defined in claim 1 in which said assembly includes a front panel member having outwardly extending flange means for engaging selected ones of said leg members and fastening means extending through said flange means of said front panel.

3. A cart assembly for use in supporting a barbecue grill comprising a set of front leg members and a set of rear leg members with a pair of opposed strut means extending respectively between a front and a rear leg member to form a generally rectangular cart structure, said strut means including a mounting flange portion and a laterally extended flange portion, said mounting and extended flange portions defining a receiving area for said leg members and providing a plurality of contact points to prevent twisting and swaying of said leg members, and securing means disposed through said extended flange portions and said leg members for securing said assembly together.

4. A cart assembly as defined in claim 3 in which said assembly includes a front panel member having outwardly extending flange means at each end for engaging said front leg members and fastening means extending through said flange means of said front panel and said front leg members for securing the upper portion of said cart together.

5. A barbecue grill cart assembly comprising a plurality of generally vertical leg members with spaced, opposing, generally horizontal strut means connected to said leg members for providing a generally horizontal frame structure, said strut means having an upper flange portion and a laterally extended flange means at each end thereof, each for engaging a selected one of said leg members with said leg members being received between said flange means and said upper flange portion for providing a plurality of contact points to prevent twisting and swaying of said leg members, and securing means disposed through said flange means and said leg members for fastening said assembly together.

6. A barbecue grill cart assembly as defined in claim 5 in which said assembly includes a front panel member having outwardly extending flange means for engaging selected ones of said leg members and fastening means extending through said flange means of said front panel.

* * * * *